United States Patent [19]

Abbott et al.

[11] Patent Number: 4,528,015
[45] Date of Patent: Jul. 9, 1985

[54] GLASS FORMING BLANK AND PLUNGER COOLING

[75] Inventors: Vaughan Abbott, North Granby; Nicholas G. Morris, Windsor; Scott M. Lambert, Enfield; Richard A. Letellier, East Windsor, all of Conn.

[73] Assignee: Emhart Industries, Inc., Farmington, Conn.

[21] Appl. No.: 472,297

[22] Filed: Mar. 4, 1983

[51] Int. Cl.³ ................................................ C03B 9/38
[52] U.S. Cl. ...................................... 65/162; 65/355; 137/876; 137/883; 137/887
[58] Field of Search .................. 65/162, 355, 356; 137/876, 887, 883

[56] References Cited

U.S. PATENT DOCUMENTS 2,580,691  1/1952  Miller ............................. 137/887 X
4,104,046  8/1978  McCreery ....................... 65/356 X Primary Examiner—Arthur Kellogg
Attorney, Agent, or Firm—H. Samuel Kieser

[57] ABSTRACT

A cooling air system for a glassware forming machine which has a plurality of individual forming units, with each unit having a plurality of different mechanisms to be cooled and each unit having the same mechanisms. The system includes a manifold associated with each mechanism, an inlet line connecting each manifold to a source of cooling air, and a pilot operated regulator in each inlet line. The manifold is connected to its associated members in all forming units. Manually operated means are associated with each of the pressure regulators for individually controlling the flow of pilot air to each pressure regulator.

4 Claims, 2 Drawing Figures

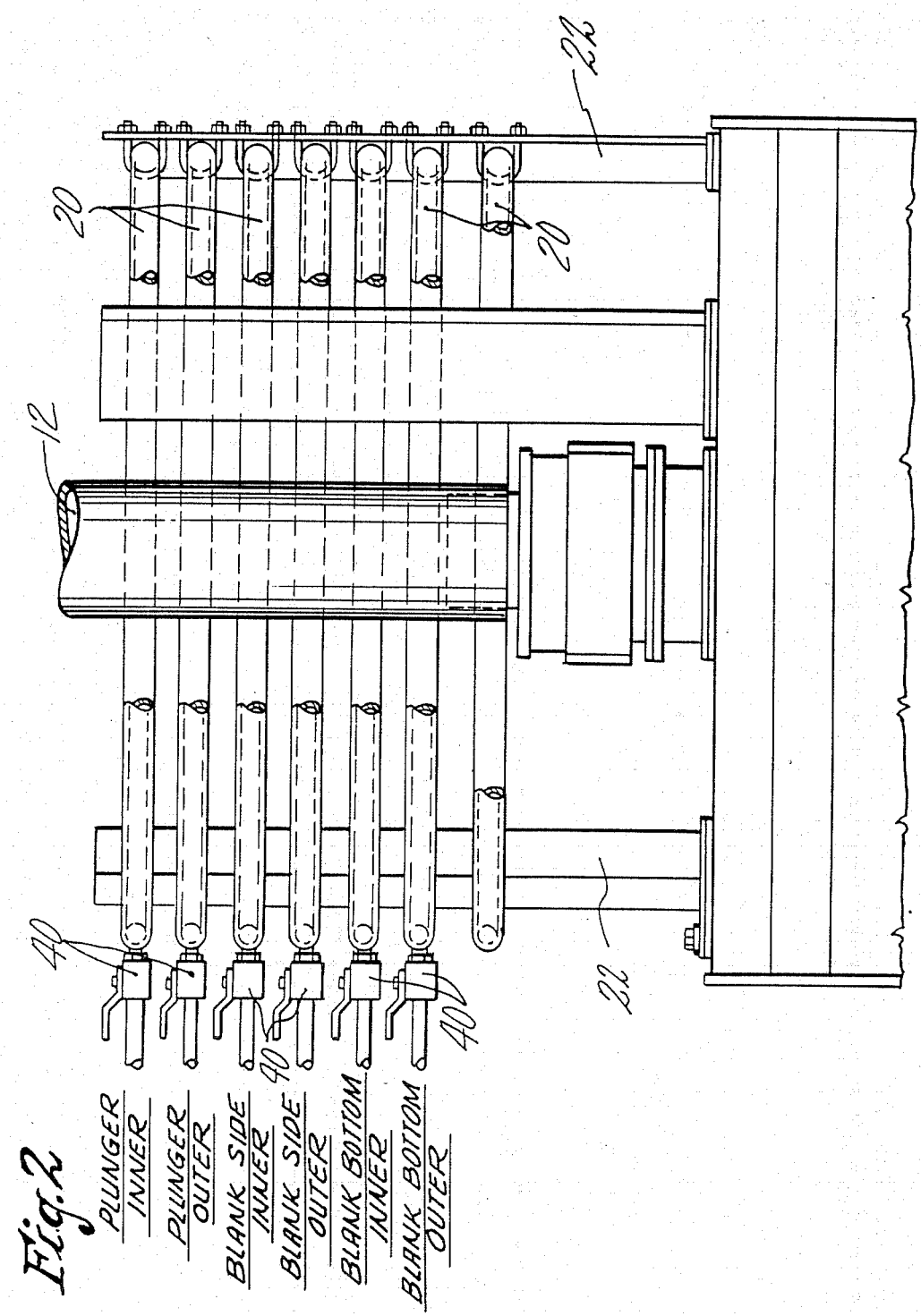

GLASS FORMING BLANK AND PLUNGER COOLING

BACKGROUND OF THE INVENTION

This invention relates generally to improved blank and plunger cooling. More particularly, this invention relates to improved blank and plunger cooling for use in conjunction with a glass forming machine of the press and blow type which is a single table, continuous rotary machine having a plurality of individual forming units mounted for rotation about the axis of the machine. This type of machine is shown in U.S. Pat. No. 1,979,211 which issued on Oct. 30, 1934 to G. E. Rowe. Machines of this type are commonly used in the glass industry today and are known as the "Emhart H-28 Machine." The type of machine shown in the No. 1,978,201 U.S. patent is a single gob machine. That is, at each forming unit, only one piece of ware is produced during a single cycle of each forming unit.

The improved version of the machine is disclosed in U.S. Pat. No. 4,339,264 issued to Francis A. Dahms on July 13, 1982, which patent is hereby incorporated by reference in this disclosure in its entirety. This type of machine shown in the patent is a double gob machine. That is, it forms two articles of ware during one cycle of each given forming unit.

Each forming unit on the machine shown in the 4,339,264 patent has inner and outer plungers and inner and outer blank mold side walls and inner and outer blank mold bottom walls all which must be cooled by a fluid such as air. The inlet cooling conduits to each of these mechanisms to be cooled were provided with an adjustment valve which was required to be adjusted to change the amount of cooling each mechanism would receive. Thus there were six valves that required adjustment on a given forming unit to change the cooling of the plunger and blank molds. In a machine with 12 forming units as shown in the 4,339,264 patent, 72 valves are required to be adjusted for proper operation of the machine. The requirement of having to adjust 72 valves was a relatively inefficient way of controlling the amount of cooling to the plungers and blank molds and resulted in a reduction of the performance of the machine.

SUMMARY OF THE INVENTION

Accordingly, it is an object of the present invention to provide improved plunger and blank cooling.

A more specific object of the present invention is a provision on a more efficient manner of regulating the cooling for the plungers and blank molds of machine having a plurality of individual sections.

These and other objects of the present invention may be achieved according to a preferred embodiment of this invention through the provision of a control air system for use with a glassware making machine having a plurality of individual units each having a plurality of different mechanisms to be cooled and each individual unit having the same mechanism as the others. A manifold is associated with each mechanism and each manifold has an inlet line connecting it to a source of cooling air. A pilot operated pressure regulator is in each inlet line. Means are provided for connecting each manifold with its associated mechanism in all the forming units. Means are also associated with each of said pressure regulator to individually control the flow of pilot air to each pressure regulator.

DESCRIPTION OF THE DRAWINGS

FIG. 2 is a schematic representation of the upper portion of a continuous rotary motion machine showing the various manifolds used in connection with the cooling of the plunger and blank molds.

DETAILED DESCRIPTION

Figure 1:
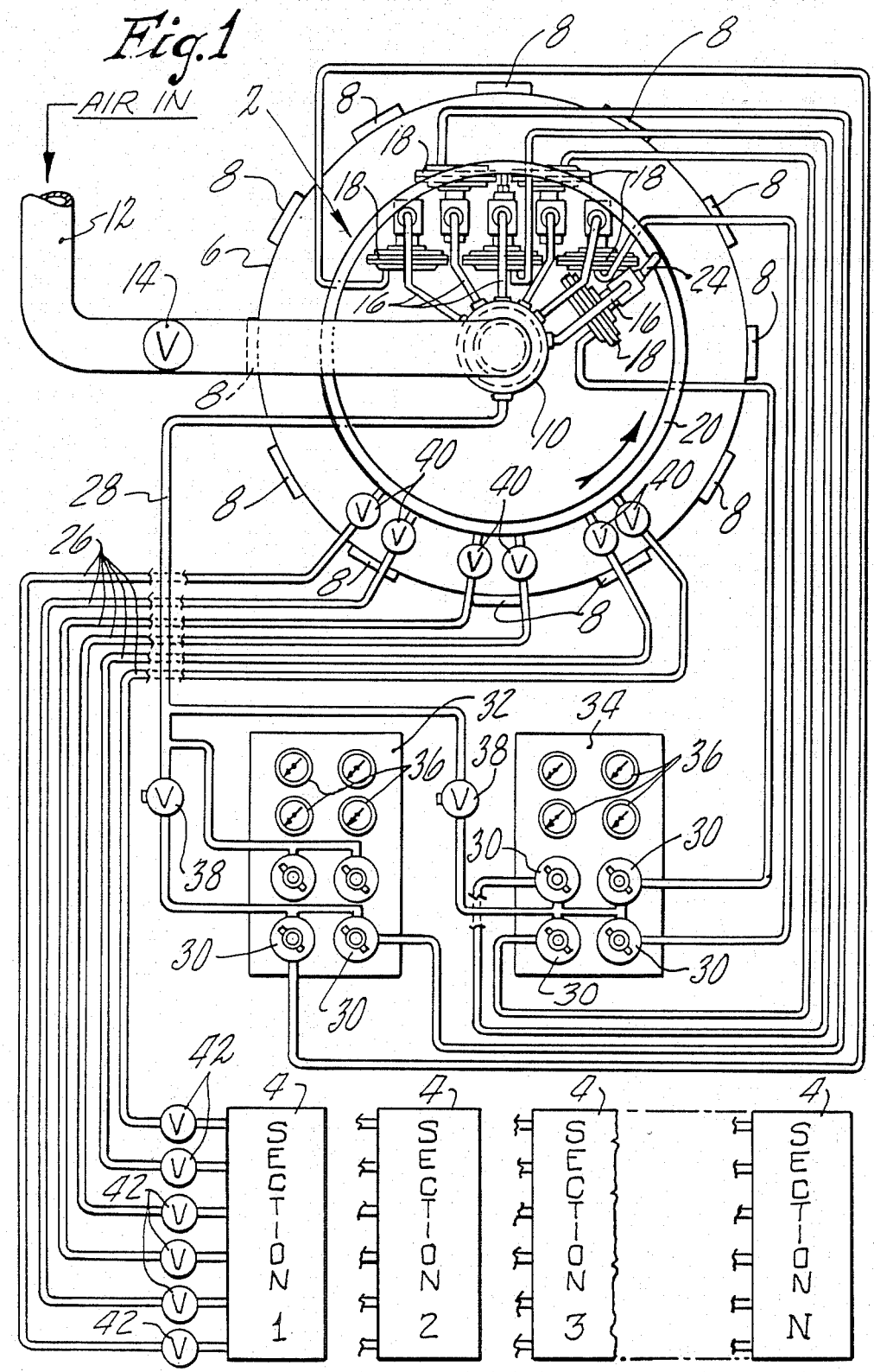
FIG. 1 is a schematic flow diagram of the piping for the plunger and blow mold cooling.

Referring to the drawings, in particular FIG. 1, a single table, continuous rotary motion machine of the type shown in U.S. Pat. No. 4,339,264 is indicated schematically by the reference numeral 2. The machine, like the one in the 4,339,264 patent has twelve individual forming units or sections 4 each capable of forming two articles of glassware during one cycle which are attached to a rotating turrent ring 6 at the various location 8. For the purpose of clarity, the sections 4 are shown schematically at the bottom of FIG. 1.

High pressure air is fed to a rotating fluid distributor 10 on the top of the machine by a stationery air inlet pipe 12. A shut-off valve 14 is provided in the air inlet. Six lines 16 extend from the fluid distributor 10 to a different one of six pilot operated pressure regulators 18. The outlet of each regulator 18 is connected to a different one of six circular manifolds 20, which are mounted one on top of the other on suitable brackets 22 at the top of the machine, by a line 24. Each manifold is connected by suitable lines, 26 to each forming unit to provide cooling air for its designated mechanism. Thus, if there are twelve forming units, there would be twelve lines running from each of the manifolds 20. Each manifold provides for the cooling of a different mechanism. By way of example, as noted in FIG. 2, the upper manifold may provide cooling air for cooling the inner plunger. The next manifold may provide cooling air for cooling the outer plunger. The next manifold may provide cooling air for the inner blank mold side wall. The next manifold may provide cooling air for the outer blank mold side wall. The next manifold may provide cooling air for the inner blank mold bottom and the next manifold provides for cooling air to the outer blank mold bottom.

Pilot air is drawn from the air intake by line 28 and goes to six regulating valves 30 mounted in control panels 32 and 34, each valve 30 being associated with a different one of the pressure regulators. Pilot air then flows from the regulating valves 30 to one side of the diaphram of it associated pressure regulator 18. A feedback line (not shown) is provided from the outlet of each pressure regulator 30 to the other side of its diaphram as it is well known in the art. Gauges 36 may be provided, each associated with a different one of the pressure regulators 18 to provide a visual indication of the manifold pressure.

A three-way valve 38 may be provided in each of the incoming lines to the control panels 32 and 34 to provide a means for shutting off the supply of pilot air and for exhausting each pilot regulator 30. The exhausting of the pilot regulators 30 cause them to close thereby shutting off the cooling air to the mechanism without disturbing the individual settings of the regulating valves 30. Shut off valves 40 may be provided at the outlet of the various manifolds 20. Adjusting valves 42 may be provided in each line to the forming units to provide for extra fine control of the cooling air to one particular mechanism of one particular forming unit if necessary.

In operation, air flows from the fluid distributor 10 through the pressure regulator to each of the manifolds 20. Air then flows from each of the manifolds 20 to its associated mechanism in all forming units of the machine. If it is desired to change the amount of cooling air for any given mechanism, its respective regulating valve 30 is turned causing a change in pilot air and causing the pressure regulator to either open more or close more. This in turn regulates the flow of cooling air to its associated manifold 20 and in turn the amount of cooling air flows to the associated mechanism in all forming units.

With the above-mentioned arrangement, the cooling air for one particular mechanism in all forming units can be adjusted by means of a single regulating valve 30. In addition, a quick shut off of cooling flow to all mechanisms on all forming units can be accomplished with the two valves 38 which can be turned to their exhaust position to exhaust the pressure regulators. In this connection it is to be noted that although two control panels 32 and 34 are shown, if space permits a single control panel having all six regulating valves thereon could be used. In this case only a single three-way valve would be needed.

While reference has been made above to a specific embodiment, it will be apparent to those skilled in the art that various modifications and alterations may be made thereto without departing from the spirit of the present invention. Therefore it is intended that the scope of this invention be ascertained by reference to the following claims.

What is claimed is:

1. A cooling air system for use with a glassware forming machine having a plurality of individual forming units, each having a plurality of different mechanisms to be cooled, each forming unit having the same mechanisms as the others, said system comprising a manifold associated with each mechanism, an inlet line connecting each manifold to a source of cooling air, a pilot operated pressure regulator in each inlet line, means connecting each manifold to its associated mechanism in all forming units, and manually operated means associated with each of said pressure regulator for individually controlling the flow of pilot air to each pressure regulator.

2. The cooling air system of claim 1 wherein each said means for controlling the flow of pilot air is a regulating valve connected to a source of cooling fluid.

3. The cooling air system of claim 2 wherein valve means is provided in the inlet to the regulating valves having an exhaust position to shut off flow of pilot air to the pressure regulator and exhaust the pressure regulator.

4. The cooling air system of claim 1 wherein said glassware forming machine is a single table rotary machine, and the mechanism of each forming unit to be cooled are the inner and outer plungers, inner and outer blank mold side walls, and inner and outer blank mold bottom walls.

* * * * *